United States Patent [19]

Ikei

[11] Patent Number: 5,715,435
[45] Date of Patent: Feb. 3, 1998

[54] TRACE CONTROL CIRCUIT IN EMULATION SYSTEM

[75] Inventor: Satoshi Ikei, Tokyo, Japan

[73] Assignee: NEC Corporation, Tokyo, Japan

[21] Appl. No.: 653,302

[22] Filed: May 24, 1996

[30] Foreign Application Priority Data

May 24, 1995 [JP] Japan .................... 7-124883

[51] Int. Cl.[6] .......................................... G06F 11/30
[52] U.S. Cl. .................... 395/500; 395/183.21; 395/568
[58] Field of Search .................... 395/500, 183.21, 395/568, 381, 395, 383

[56] References Cited

U.S. PATENT DOCUMENTS

| | | | |
|---|---|---|---|
| 4,422,141 | 12/1983 | Shoji | 395/183.06 |
| 4,937,770 | 6/1990 | Samuels et al. | 364/578 |
| 5,056,013 | 10/1991 | Yamamoto | 395/500 |
| 5,564,041 | 10/1996 | Matsui et al. | 395/500 |

OTHER PUBLICATIONS

Meusel, et al., "Softwareanalyse mit Logikanalysesystem LAS 20", Radio Fernsehen Elektronik, vol. 35, No. 2, Feb. 1986, Berlin, DE, pp. 71–74.

IBM Technical Disclosure Bulletin, vol. 34, No. 7A, Dec. 1991, NY, pp. 467–469, "Bus monitor using DRAM interface for a Harvard–style computer architecture".

Richter, "Software analyse am i8086", Nacrichten Technik Elektronik, vol. 40, No. 7, 1990, Berlin, DE, pp. 258–261.

*Primary Examiner*—Kevin J. Teska
*Assistant Examiner*—N.L. Dehlitsch-Moats
*Attorney, Agent, or Firm*—Foley & Lardner

[57] ABSTRACT

In a trace control circuit for an emulation system, a program fetch signal is generated on the basis of a CPU read signal and a CPU program fetch status signal, both generated from the CPU included in the trace control circuit, and then, is thinned out at an arbitrary proportion so as to generate a trace memory write signal to a trace memory, so that a trace imformation outputted from the CPU is stored in a trace memory in response to the trace memory write signal thus generated. Accordingly, the memory capacity of the trace memory can be apparently increased.

4 Claims, 8 Drawing Sheets

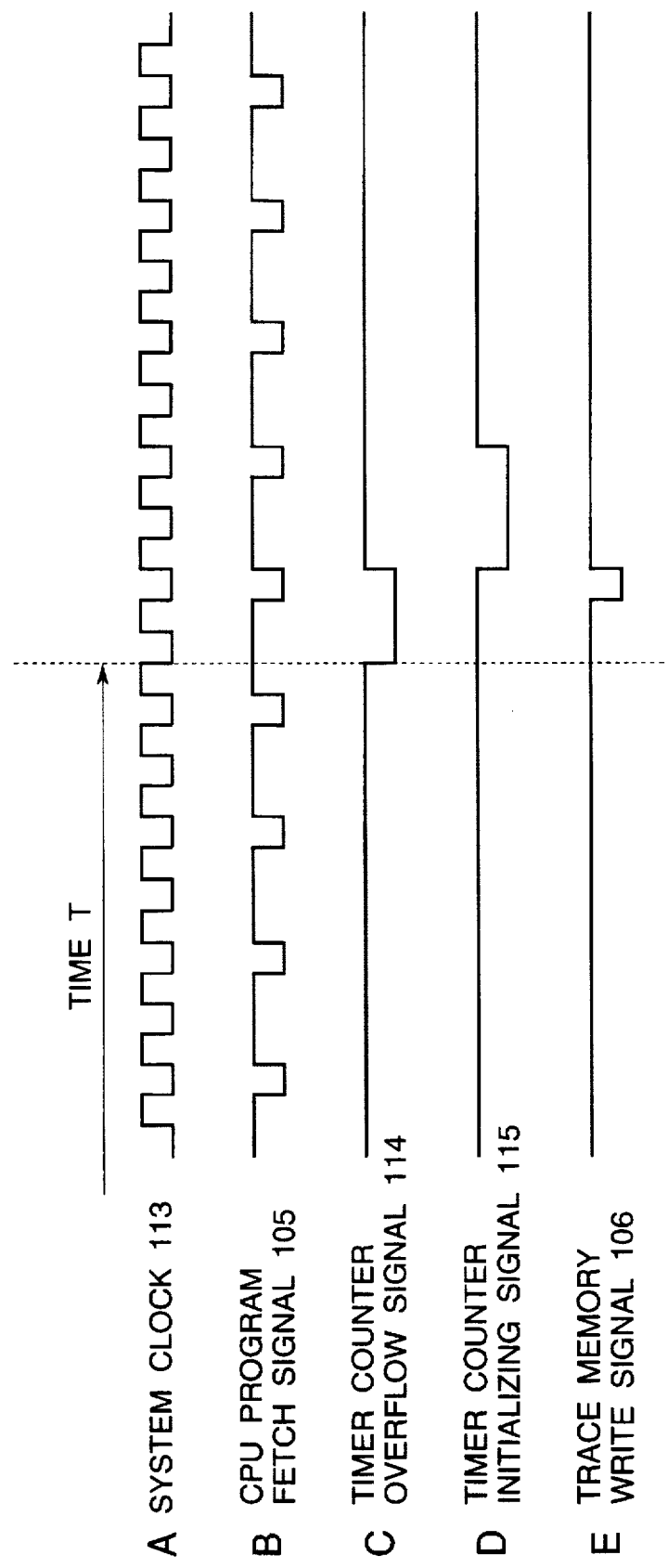

TRACE CONTROL CIRCUIT IN EMULATION SYSTEM

BACKGROUND OF THE INVENTION

1. Field of the Invention

The present invention relates to an emulation system, and more specifically to an improved trace control circuit in an emulation system used for an operation analysis and a performance evaluation of a computer.

2. Description of Related Art

In the prior art, in the case of developing and evaluating a software for an application system using a microcomputer, it has been a general practice to utilize an emulation system, which can execute an operation equivalent to the microcomputer used in the application system concerned, mid which includes various functions for effective development of a software, for example, a break function of stopping a program execution at an arbitrary point, and a trace function for storing a history or trace of an execution of a CPU in a memory and for displaying the stored trace of the execution of the CPU.

In the case of developing an application system using a microcomputer, by use of the emulation system as mentioned above, a trace control means including a data processing means having a function equivalent to that of a microcomputer to be assembled in the application system concerned, is directly connected to the application system at a location where the microcomputer is to be actually connected in the application system concerned. With this connection, the application system can realize completely the same operation condition as that where the microcomputer was actually assembled in the application system concerned. Therefore, by connecting the trace control means directly to the application system and by actually operating the application system, the software under development is evaluated by examining the operation, and therefore, various problems in the software can be easily solved.

One of various software developing procedures utilizing the above mentioned emulation system includes a process called a "program operation analysis and performance evaluation procedure", which is used for the purpose of analyzing and evaluating whether or not the developed program exerts an expected performance. Therefore, this procedure is performed at a last stage of a software developing process, and accordingly, can be said to be an extremely important step in the software developing procedure, which determines performance of the application system. In particular, in order to elevate an overall performance of the application system, it is necessary not only to grasp a whole trace of the program from a start to a termination of the system, but also to carry out analysis and evaluation, for example, for analyzing the frequency of operation& of each of modules and for elevating a processing speed of modules having a high operation frequency.

In the prior art, for performing the operation analysis and performance evaluation of the program, it has been a general practice to utilize the trace function of the emulation system. This operation analysis and performance evaluation method utilizing the trace function of the emulation system includes (1) to cause a trace memory having a definite memory capacity and provided as a trace control means in the emulation system, to store an execution process of a CPU, and (2) thereafter to examine the execution process for the purpose of analyzing and evaluating the operation process of the program. (Conventionally, the trace memory has a depth of 8K to 32K, and a CPU execution information of the amount corresponding to the depth can be stored in the trace memory.)

Referring to FIG. 1, there is shown a block diagram illustrating a typical example of a trace control means used in a prior art emulation system.

As shown in FIG. 1, for the purpose of realizing a trace function, the prior art trace control means includes a CPU (central processing unit) 1 having an operation function equivalent to that of a microcomputer to be assembled in an application system, a trace memory 2 and a trace memory control circuit 3. Here, assuming that the trace memory 2 has a memory capacity of for example 32K×128 bits, this means that the trace memory 2 can store data of a 128-bit length up to 32K frames.

An address is supplied to the trace memory 2 through a trace memory address bus 102 from the trace memory control circuit 9, and data is supplied to the trace memory 2 through a trace dam bus 101 from the CPU 1. A data writing of the trace memory is controlled by a trace memory write signal 117 which is supplied from an AND circuit 11 as a logical product of a CPU read signal 103 and a CPU write signal 117. A reading of the trace data stored in the trace memory 2 is controlled by a trace memory read signal 107 supplied from the trace memory control circuit 3.

Now, operation of the prior an trace control means will be described with reference to FIG. 2, which is a timing chart illustrating an operation of the trace control means shown in FIG. 1 in which four CPU bus cycles are generated by the CPU 1. In the CPU bus cycle, as shown in "C" of FIG. 2, various information including an address/read data (for example, address information for a data reading outputted from the CPU 1, and data information read out from a read destination) or an address/write data, is outputted onto the trace data bus 101.

A first bus cycle "1" in the CPU bus cycle shown in "A" of FIG. 2, is a data read cycle, in which, as shown in "C" of FIG. 2, an address/read data is outputted onto the trace data bus 101. On the other hand, an address information "000" indicating a data storing location within the trace memory 2, is outputted from the trace memory control circuit 3 to the trace memory address bus 102, as shown in "G" of FIG. 2.

In this condition, when the CPU read signal 103 outputted from the CPU 1 is brought to an active low level (negative logic), the trace memory write signal 117 outputted from the AND gate 11 is also brought to an active low level, so that the trace dam information on the trace data bus 101 is written to the data storing location "000" in the trace memory 2.

A next CPU bus cycle "2" is also the dam read cycle, and on the other hand, an address information "001" indicating a data storing location is outputted from the trace memory control circuit 3 to the trace memory address bus 102, as shown in "G" of FIG. 2. In this case, similarly to the CPU bus cycle "1", the trace data information on the trace data bus 101 is written to the data storing location "001" in the trace memory 2.

A further next CPU bus cycle "3" is a data write cycle. In this case, when the CPU write signal 116 outputted from the CPU 1 is brought to an active low level (negative logic), the trace memory write signal 117 outputted from the AND gate 11 is also brought the active low level, so that the trace data information on the trace data bus 101 is written to the data storing location "002" in the trace memory 2 designated through the trace memory address bus 102, completely similarly to the CPU bus cycles "1" and "2".

Thus, in all the data read cycles and the data write cycles generated in the CPU 1, the trace data information on the trace dam bus 101 is written to the sequentially designated data storing locations in the trace memory 2. In the prior art, it is an ordinary practice to carry out the operation analysis and evaluation of the program, by reading out the operation information of the CPU 1 sequentially stored in the trace memory 2 in accordance with the above mentioned procedures.

As seen from the above, the trace means used in the prior art emulation system mentioned above is constructed to sequentially store all the bus cycles generated by the CPU, in the trace memory having a definite memory capacity. Therefore, in the case of analyzing and evaluating the overall flow of the program from its start to its end, there is no other than a method of fragmentarily tracing the program, dependently upon the memory capacity of the trace memory. In other words, it is not possible to grasp a continuous whole trace of the program execution.

Recently, a proportion of the program development based on an assembly language has reduced, and to the contrary, there is a tendency that a proportion of the program development based on a high level language is increasing. As a result, them is occurring a demand of carrying out the operation analysis and performance evaluation of the program at a level of the high level language. However, generally, each one statement described in the high level language corresponds to a few instructions to a few tens instructions. Therefore, in order to store this one statement in the trace memory, it becomes necessary to prepare a trace memory having a memory capacity which is a few times to a few tens times the trace memory capacity required in the assembly language in the prior art. This means that the prior art trace means is difficult to meet with the program described in the high level language.

SUMMARY OF THE INVENTION

Accordingly, it is an object of the present invention to provide an emulation system which has overcome the above mentioned detect of the conventional one.

Another object of the present invention is to provide an emulation system having a trace means capable of substantially grasping the whole flow of a program from its start to its end, so as to be able to easily analyze and evaluate the program described in the high level language.

The above and other objects of the present invention are achieved in accordance with the present invention by an emulation system having a trace control means which at least comprises:

- a CPU having an operation function equivalent to that of a microcomputer which executes a program to be analyzed and evaluated;
- a trace memory storing a trace data outputted from the CPU in response to a trace memory write signal, the trace memory outputting the trace data stored therein in response to a trace memory read signal;
- a trace memory write signal generating circuit receiving a CPU read signal outputting from the CPU and a program fetch status signal outputted from the CPU and indicating that a program fetch cycle is generated in the CPU, for generating the trace memory write signal to the trace memory; and
- a trace memory control circuit for generating the trace memory read signal to the trace memory.

In one embodiment, the trace memory write signal generating circuit includes:

- a logical sum circuit receiving the CPU read signal and the program fetch status signal, for outputting a CPU program fetch signal; and
- a modulating circuit receiving the CPU program fetch signal, for outputting the trace memory write signal.

More specifically, the modulating circuit includes:

- a frequency-divider receiving the CPU program fetch signal, for outputting a plurality of frequency-divided signals obtained by frequency-dividing the CPU program fetch signal; and
- a selector receiving the plurality of frequency-divided signals, for outputting a selected one of the plurality of frequency-divided signals as the trace memory write signal.

Alternatively, the modulating circuit includes:

- a timer counter receiving and counting a system clock, for outputting a timer counter overflow signal when a count value reaches a value corresponding to a predetermined counting time;
- a flipflop receiving the timer counter overflow signal and the CPU program fetch signal, for outputting a timer counter initializing signal to the timer counter so as to initialize the timer counter; and
- a logical sum circuit receiving the timer counter overflow signal and the CPU program fetch signal, for outputting a logical sum of the timer counter overflow signal and the CPU program fetch signal, as the trace memory write signal.

The above and other objects, features and advantages of the present invention will be apparent from the following description of preferred embodiments of the invention with reference to the accompanying drawings.

BRIEF DESCRIPTION OF THE DRAWINGS

FIG. 8 is a timing chart illustrating an operation of the modulator shown in FIG. 7.

DESCRIPTION OF THE PREFERRED EMBODIMENTS

Figure 3:
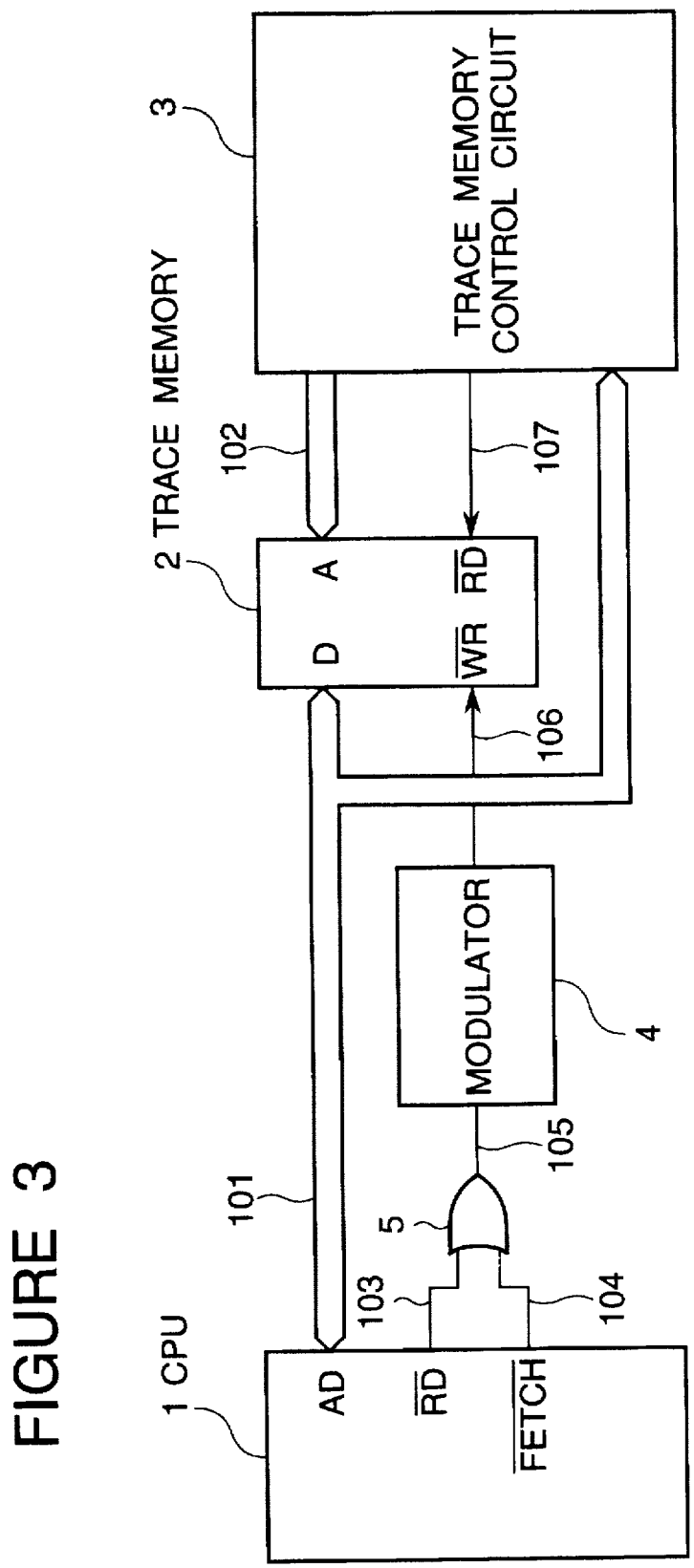
FIG. 3 is a block diagram of one embodiment of a trace control means used in the emulation system in accordance with the present invention.

Referring to FIG. 3, there is shown a block diagram of one embodiment of a trace control means used in the emulation system in accordance with the present invention. In FIG. 3, elements similar or corresponding to those shown in FIG. 1 are given the same Reference Numerals, and explanation thereof in connection with their construction and operation will be omitted for simplification of description.

The trace control means shown in FIG. 3 comprises a CPU (central processing unit; processor) 1 having an operation function equivalent to that of a microcomputer to be used in an application system, a trace memory 2, a trace memory control circuit 3, a modulator 4 and an OR circuit 5, which are connected as shown.

Figure 1:
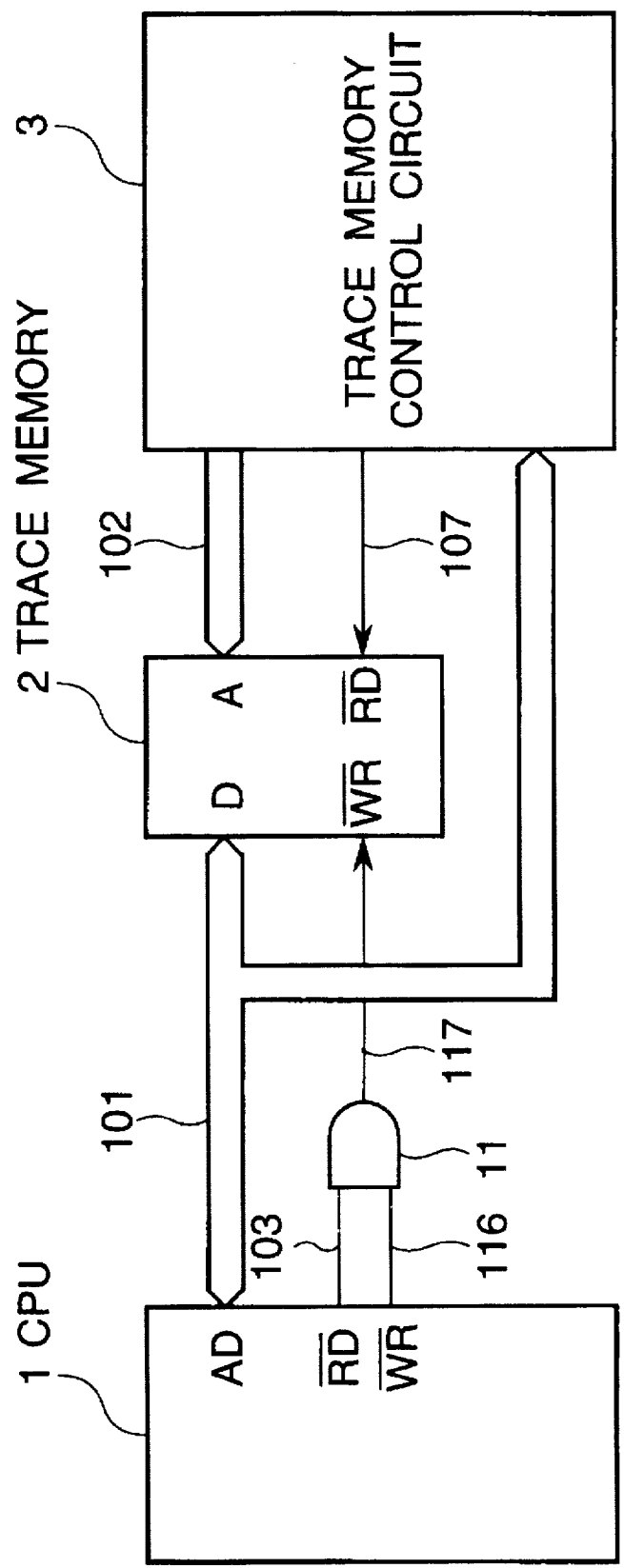
FIG. 1 is a block diagram illustrating a typical example of a trace control means used in a prior art emulation system.
Figure 2:
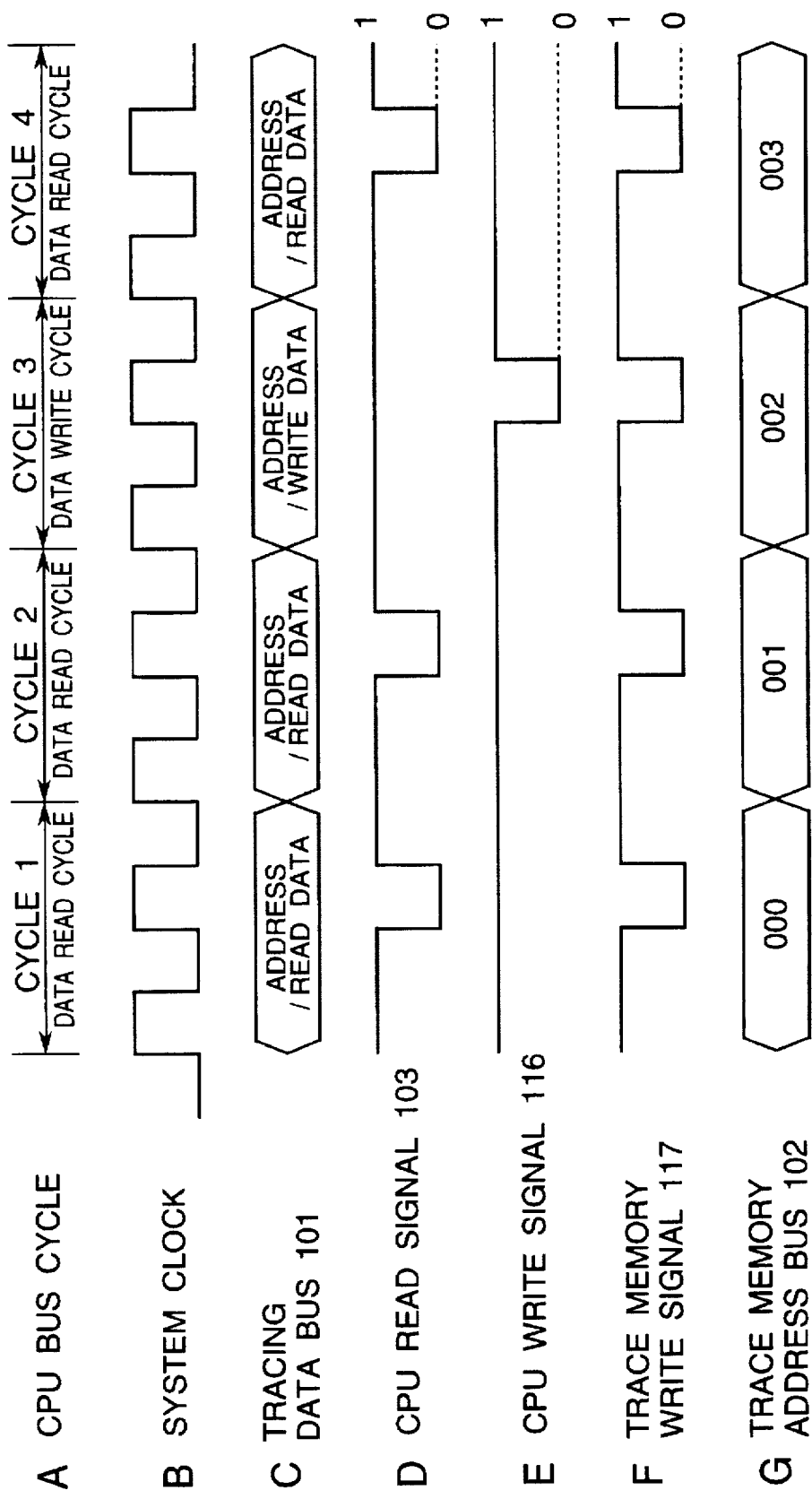
FIG. 2 is a timing chart illustrating an operation of the trace control means shown in FIG. 1.

As seen from comparison between FIGS. 1 and 3, the shown embodiment includes the OR circuit 5 and the modulator 4, in place of the AND circuit 11 in FIG. 1, for the purpose of generating a trace memory write signal 106 to the trace memory 2.

The OR circuit 5 receives a negative logic CPU program fetch status signal 104, which is generated in the CPU 1 to indicate only a program fetch cycle generated in the CPU 1, and the negative logic CPU read signal 103 also generated in the CPU 1. The OR circuit 5 generates a logical sum of the negative logic CPU program fetch status signal 104 and the negative logic CPU read signal 103, as a CPU program fetch signal 105. Accordingly, this CPU program fetch signal 105 is brought to an active low level (namely, negative logic) only when the program fetch cycle is generated in the CPU 1. This CPU program fetch signal 105 is supplied to the modulator 4, in which the CPU program fetch signal 105 is modulated in an arbitrary manner to the trace memory write signal 106, which is also a negative logic signal.

When the trace memory write signal 106 is active (namely, a low level), the trace data information on the trace data bus 101 is written into the trace memory 2 at a memory location designated by the trace memory control circuit 3 through the trace memory address bus 102.

Now, a trace operation of the first embodiment shown in FIG. 3 will be described with reference to FIG. 4, which is a timing chart illustrating an operation of the trace control means shown in FIG. 3.

Figure 4:
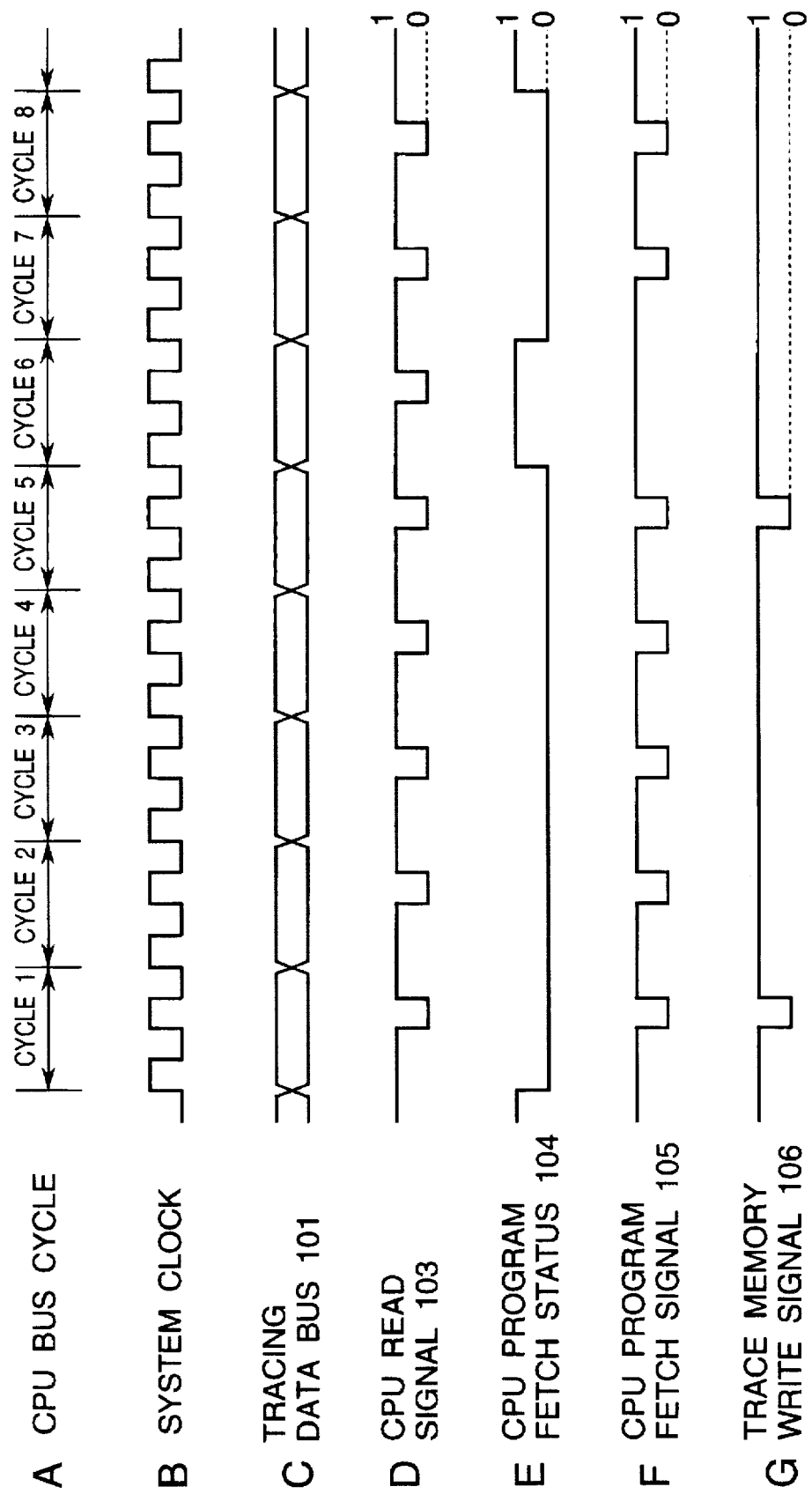
FIG. 4 is a timing chart illustrating an operation of the trace control means shown in FIG. 3.

As shown in "D" from the CPU 1 is bead signal 103 outputted from the CPU 1 is brought to an active low level (negative logic) in synchronism with each second system dock as shown in "B" of FIG. 4 in each CPU bus cycle. This CPU read signal 103 is supplied to the ON circuit 5.

As shown in "E" of FIG. 4, the CPU program fetch status signal 104 outputted from the CPU 1, is brought to an active low level (negative logic) during CPU bus cycles "1" to "5" and "7" to "8", so as to indicate that these CPU bus cycles "1" to "5" and "7" to "8" are a program fetch cycle. This CPU program fetch status signal 104 is also supplied to the OR circuit 5.

Accordingly, the CPU program fetch signal 105 as shown in "F" of FIG. 4 generated by the OR circuit 5 is brought to an active low level (also negative logic) only during the CPU bus cycles corresponding to the CPU program fetch cycles. Therefore, the CPU program fetch signal 105 can cause the trace memory 2 to store only the trace of the program execution of the CPU 1.

The CPU program fetch signal 105 is supplied to me modulator 4, where the CPU program fetch signal 105 is modulated to the trace memory write signal 106. In the shown example, as the result of the modulation in the modulator 4, the write pulse signal existing in the CPU program fetch signal 105 is removed in the CPU bus cycles "2" to "4" and "7" to "8". In other words, the trace memory write signal 106 outputted from the modulator 4 is obtained by thinning out the pulses included in the CPU program fetch signal 105. The trace memory write signal 106 is supplied to the trace memory 2.

Accordingly, in the trace control means in accordance with the present invention, all of the program execution information processed in the CPU 2 is not stored in the trace memory 2. The program execution information processed in the CPU 2 is stored in the trace memory 2 after the program execution information is thinned out at an arbitrary proportion.

Figure 5:
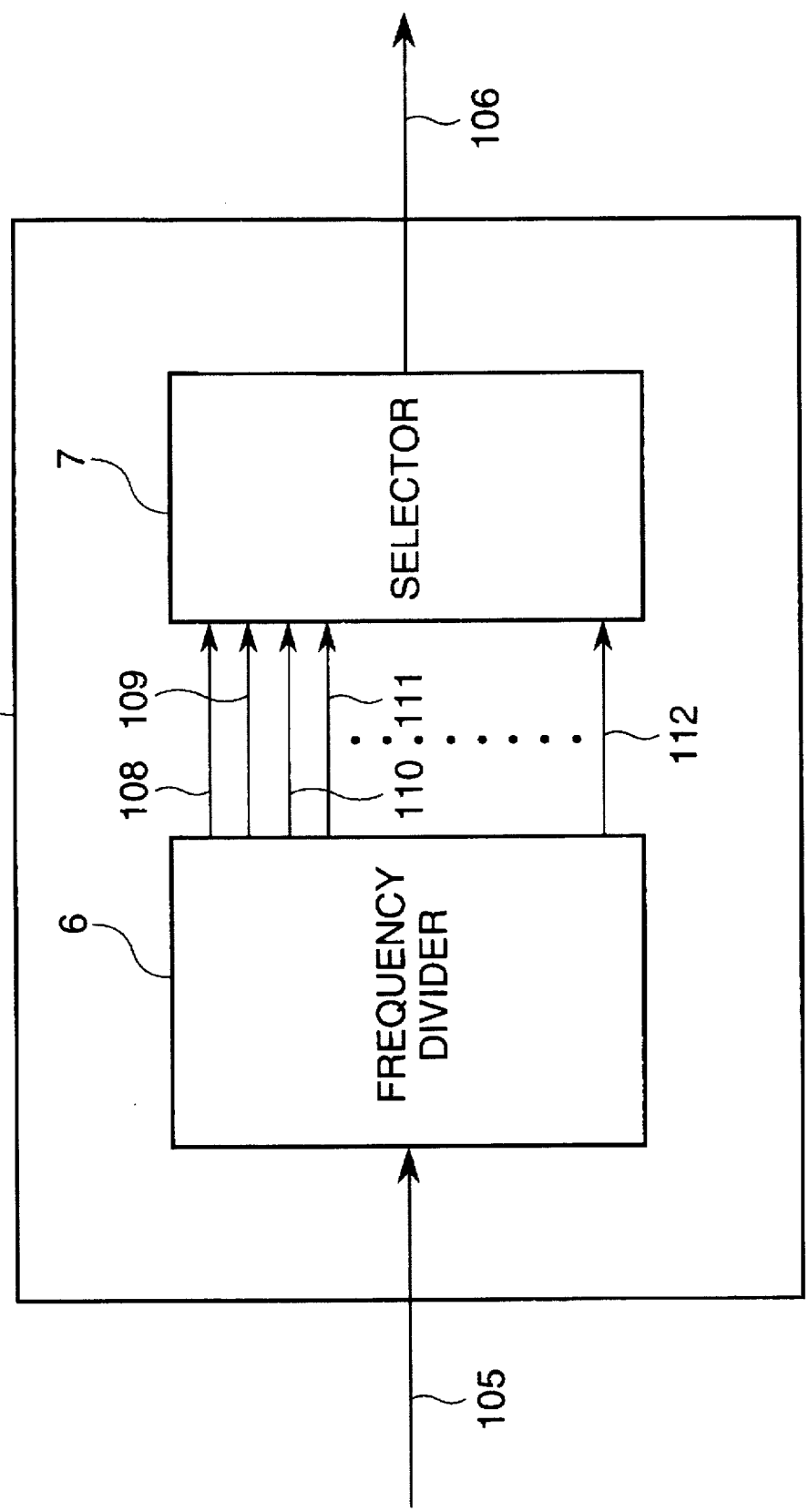
FIG. 5 is a block diagram of a first embodiment of the modulator used in the trace control means shown in FIG. 3.
Figure 6:
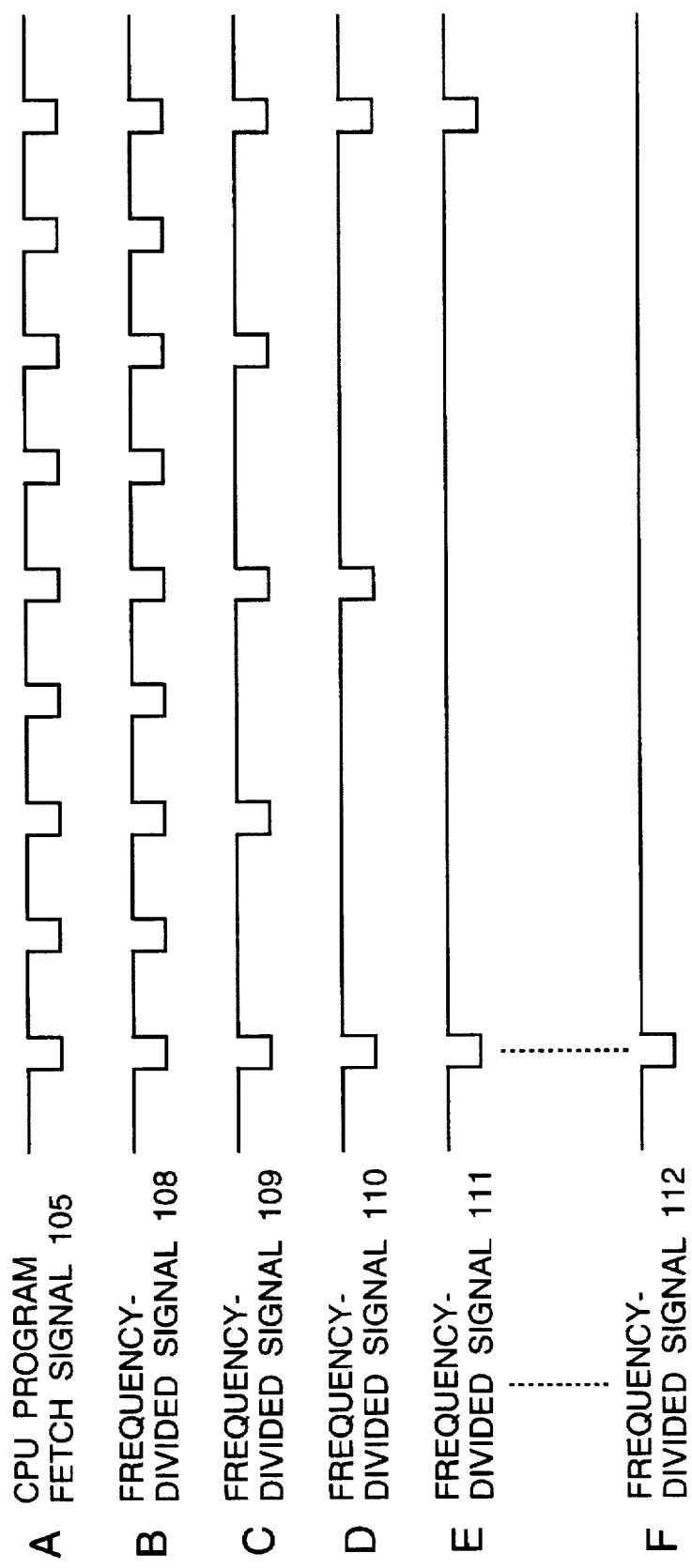
FIG. 6 is a timing chart illustrating an operation of the modulator shown in FIG. 5.

Referring to FIG. 5, there is shown a block diagram of a first embodiment of the modulator 4 used in the trace control means shown in FIG. 3 FIG. 6 is a timing chart illustrating an operation of the modulator shown in FIG. 5.

This first embodiment of the modulator 4 includes a frequency divider 6 and a selector 7 which are connected as shown. The frequency divider 6 receives the CPU program fetch signal 105 as shown is "A" of FIG. 6, and generates a plurality of frequency-divided signals of different frequencies, including a "1/1" frequency-divided signal 108, a "1/2" frequency-divided signal 109, a "1/4" frequency-divided signal 110, a "1/8" frequency-divided signal 111, . . . , and a "1/N" frequency-divided signal 112, as shown in "B", "C", "D", "E" and "F" of FIG. 6, respectively. Here, for example, "N"=2$^n$ where "n" is a positive integer larger than "4".

These frequency-divided signals 108 to 112 are supplied to the selector 7, which selects only one of the frequency-divided signals 108 to 112 so as to output the selected frequency-divided signal as the trace memory write signal 106

Accordingly, in the first embodiment of the modulator 4 shown in FIG. 5, the negative logic CPU program fetch signal 105 is thinned out at an arbitrary proportion of "1/M" where "M" is an arbitrary positive integer, and thereafter, is supplied to the trace memory 2 as the trace memory write signal 106.

Figure 7:
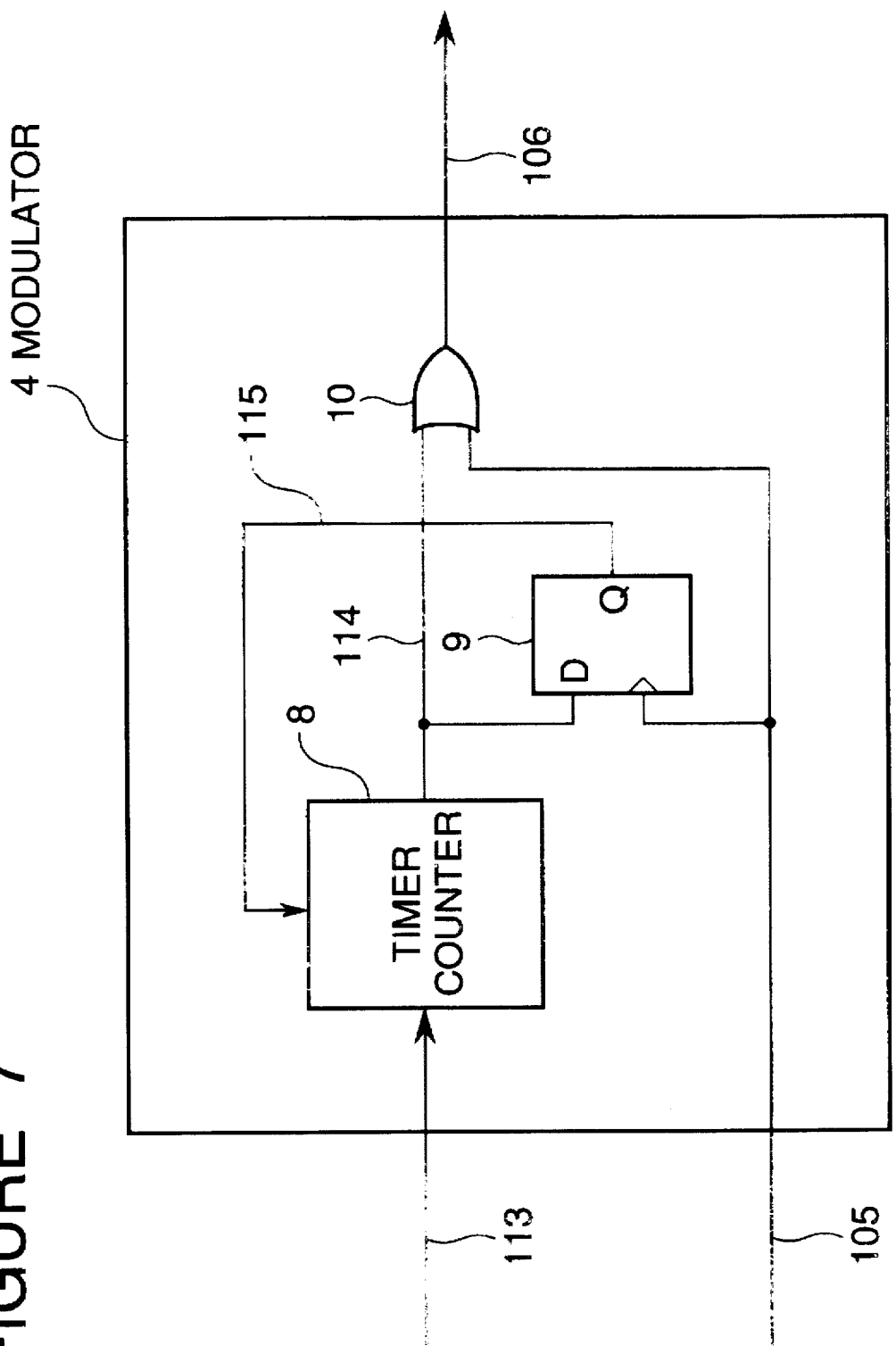
FIG. 7 is a block diagram of a second embodiment of the modulator used in the trace control means shown in FIG. 3.

Referring to FIG. 7, there is shown a block diagram of a second embodiment of the modulator 4 used in the trace control means shown in FIG. 3. FIG. 8 is a timing chart illustrating an operation of the modulator shown in FIG. 7.

The second embodiment of the modulator 4 shown in FIG. 7 includes a timer counter 8, a flipflop 9 and an OR circuit 10, which are connected as shown. The timer counter 8 receives and counts a system clock 113 as shown in "A" of FIG. 8. When a count value of the timer counter 8 reaches the number of clocks corresponding to a predetermined time "T", the timer counter 8 outputs a negative logic active timer counter overflow signal 114 as shown in "C" of FIG. 8, which is supplied to a data input of the flipflop 9 and the OR circuit 10. Furthermore, the CPU program fetch signal 105 is supplied to a clock input of the flipflop 9 and the OR circuit 10.

Therefore, the OR circuit 10 receiving the negative logic active timer counter overflow signal 114 and the negative logic active CPU program fetch signal 105, outputs the negative logic active trace memory write signal 106 as shown in "E" of FIG. 8. On the other hand, the negative logic active timer counter overflow signal 114 is latched in the flipflop 9 in synchronism with the CPU program fetch signal 105, so that the flipflop 9 outputs a negative logic active timer counter initializing signal 115 as shown in "D" of FIG. 8 to the timer counter 8, so as to cause the timer counter 8 to restart its counting from the initialized condition.

Accordingly, in the second embodiment of the modulator 4 shown in FIG. 7, the negative logic CPU program fetch signal 105 is picked up (namely, thinned out) at intervals of the predetermined time "T", and thereafter, is supplied to the trace memory 2 as the trace memory write signal 106.

In the above mentioned two embodiments of the modulator 4, after the CPU program fetch signal 105 is thinned out, the CPU program fetch signal 105 is supplied as the trace memory write signal 106. Accordingly, information concerning the program fetch cycle required to follow up the trace of the program executed in the CPU 1, is thinned out at an arbitrary proportion, and the thinned information is sequentially stored in the trace memory 2. Thus, the trace information, stored in the trace memory, of the program execution of the CPU 1, is continuous or a series of intermittent information. However, because of continuity of a program in the von Neumann type computer, it is possible to analyze and evaluate a flow of the whole of the program without being influenced by the thinned-off or omitted information. As a result, there is realized a trace function equivalent or comparable to a prior art type trace means imaginarily having the trace memory capacity which is a few times to a few tens times that of the trace memory provided in the prior art trace means.

Particularly, in the case of carrying out the operation analysis and performance evaluation of a program so described in a high level language that each one statement is composed of a few instructions to a few tens instructions, it is possible to replace execution of the one statement with the trace of execution of at least one instruction of a plurality of instructions included in the one statement, and therefore, it is, in principle, no longer necessary to trace all the instructions included in the program described in the high level language. Accordingly, it is possible to substantially completely analyze and evaluate a program described in a high level language, on the basis of the trace information obtained in accordance with the present invention.

As seen from the above, the trace control means used in the emulation system in accordance with the present invention is characterized in that a program fetch signal is generated on the basis of a CPU read signal and a CPU program fetch status signal (both generated from the CPU included in the trace control means), and then, is thinned out at an arbitrary proportion so as to generate a trace memory write signal, so that a trace information outputted from the CPU is stored in a trace memory in response to the trace memory write signal thus generated. Accordingly, the memory capacity of the trace memory can be apparently increased.

Therefore, since the memory capacity of the trace memory can be increased as mentioned above, it is possible to grasp the flow of the whole of the program to be analyzed and evaluated, so as to carry out the operation analysis and performance evaluation of a program on the basis of the flow of the whole of the program. In addition, it is also possible to carry out the operation analysis and performance evaluation of a program described in a high level language.

The invention has thus been shown and described with reference to the specific embodiments. However, it should be noted that the present invention is in no way limited to the details of the illustrated structures but changes and modifications may be made within the scope of the appended claims.

I claim:

1. An emulation system having a trace control means which at least comprises:

a CPU having an operation function equivalent to that of a microcomputer which executes a program to be analyzed and evaluated;

a trace memory storing a trace data outputted from said CPU in response to a trace memory write signal, said trace memory outputting said trace data stored therein in response to a trace memory read signal;

a trace memory write signal generating circuit receiving a CPU read signal outputted from said CPU and a program fetch status signal outputted from said CPU and indicating that a program fetch cycle is generated in said CPU, for generating said trace memory write signal to said trace memory; and a trace memory control circuit for generating said trace memory read signal to said trace memory.

2. An emulation system claimed in claim 1 wherein said trace memory write signal generating circuit includes:

a logical sum circuit receiving said CPU read signal and said program fetch status signal, for outputting a CPU program fetch signal; and a modulating circuit receiving said CPU program fetch signal, for outputting said trace memory write signal.

3. An emulation system claimed in claim 2 wherein said modulating circuit includes:

a frequency-divider receiving said CPU program fetch signal, for outputting a plurality of frequency-divided signals obtained by frequency-dividing said CPU program fetch signal; and a selector receiving said plurality of frequency-divided signals, for outputting a selected one of said plurality of frequency-divided signals as said trace memory write signal.

4. An emulation system claimed in claim 2 wherein said modulating circuit includes:

a timer counter receiving and counting a system clock, for outputting a timer counter overflow signal when a count value reaches a value corresponding to a predetermined counting time:

a flip flop receiving said timer counter overflow signal and said CPU program fetch signal, for outputting a timer counter initializing signal to said timer counter so as to initialize said timer counter; and a logical sum circuit receiving said timer counter overflow signal and said CPU program fetch signal, for outputting a logical sum of said timer counter overflow signal and said CPU program fetch signal, as said trace memory write signal.

* * * * *